United States Patent
Kasai et al.

(10) Patent No.: US 7,680,627 B2
(45) Date of Patent: Mar. 16, 2010

(54) PLANT OPERATION DATA MONITORING APPARATUS

(75) Inventors: Takashi Kasai, Fuchu (JP); Tsuneo Watanabe, Inagi (JP); Kensuke Kawai, Tokorozawa (JP); Keiko Ootani, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/060,609

(22) Filed: Apr. 1, 2008

(65) Prior Publication Data
US 2009/0248179 A1   Oct. 1, 2009

(51) Int. Cl.
G06F 11/30 (2006.01)
G21C 17/00 (2006.01)

(52) U.S. Cl. ...................... 702/182; 702/183
(58) Field of Classification Search ............... 702/81, 702/84, 182–185, 188; 700/108–110
See application file for complete search history.

(56) References Cited

U.S. PATENT DOCUMENTS

2003/0142766 A1 * 7/2003 Golanbari et al. ........... 375/343
2006/0190095 A1 * 8/2006 Nakahara et al. ............ 700/9
2009/0076634 A1 * 3/2009 Takahara et al. ............ 700/80

FOREIGN PATENT DOCUMENTS

| JP | 05-120582 | 5/1993 |
| JP | 2004-346716 | 12/2004 |
| JP | 2008-097254 | * 4/2008 |

OTHER PUBLICATIONS

English Abstract of JP 2008-097254, Apr. 2008.*

* cited by examiner

*Primary Examiner*—Michael P Nghiem
(74) *Attorney, Agent, or Firm*—Oblon, Spivak, McClelland, Maier & Neustadt, L.L.P.

(57) ABSTRACT

A most recent value of data fetched from a plant facility is temporarily stored and extracted and then stored in a plant history data table. On another front, a monitoring point for monitoring a plant error is registered in response to an operator request. A monitoring point is used as a key to select and register a main variable point having a strong correlation from the plant history data table. A statistical upper/lower limit function is defined on the basis of time-series plant data of monitoring points and main variable points. By referring to information in a table in which a limit value function is stored, the limit value is periodically matched with the content of a plant-data most-recent-value table. If the most recent value is outside the limit range, deviation information is stored in a determination result table. If a new plant error occurs, an error signal and the content of the determination result table is outputted and displayed.

14 Claims, 19 Drawing Sheets

| TIME | POINT A | POINT B | POINT C | POINT D | POINT E | ·· |
|---|---|---|---|---|---|---|
| 06 / 01 / 02 00:01 | 100.0 | 1.92 | 25.3 | 9.05 | 234.1 | : |

A5

| TIME | POINT A | POINT B | POINT C | POINT D | POINT E | · · |
|---|---|---|---|---|---|---|
| 06 / 01 / 01  01:00 | 103.2 | 1.92 | 25.3 | 9.05 | 234.1 | · · |
| 06 / 01 / 01  01:01 | 102.1 | 1.91 | 25.3 | 9.54 | 235.2 | · · |
| 06 / 01 / 01  01:02 | 110.2 | 1.98 | 25.2 | 9.53 | 236.7 | · · |
| 06 / 01 / 01  01:03 | 101.7 | 1.97 | 25.2 | 9.52 | 240.9 | · · |
| 06 / 01 / 01  01:03 | 100.4 | 1.88 | 25.2 | 9.03 | 233.3 | · · |
| 06 / 01 / 01  01:03 | 99.7 | 1.87 | 25.1 | 0.21 | 321.2 | · · |
| : | : | : | : | : | : | |

| | 1 | 2 | 3 | 4 | 5 | · · | m |
|---|---|---|---|---|---|---|---|
| MONITORING POINT | POINT A | POINT D | (RESERVED) | (RESERVED) | (RESERVED) | : | (RESERVED) |

| MONITORING POINT | MAIN VARIABLE POINT 1 | MAIN VARIABLE POINT 2 | MAIN VARIABLE POINT 3 | · · | n |
|---|---|---|---|---|---|
| POINT A | POINT Y | — | — | | — |
| POINT D | POINT W | POINT Z | — | | — |
| (RESERVED) | | | | | |
| (RESERVED) | | | | | |
| : | | | | | |
| m | | | | | : |

FIG.14

| Y | X | FUNCTION | |
|---|---|---|---|
| POINT A | POINT Y | UPPER LIMIT | $Y = a_1 X^2 + b_1 X + c_1$ |
| | | LOWER LIMIT | $Y = a_2 X^2 + b_2 X + c_2$ |
| POINT D | POINT W | UPPER LIMIT | $Y = a_3 X^2 + b_3 X + c_3$ |
| | | LOWER LIMIT | $Y = a_4 X^2 + b_4 X + c_4$ |
| POINT D | POINT Z | UPPER LIMIT | $Y = a_5 X^2 + b_5 X + c_5$ |
| | | LOWER LIMIT | $Y = a_6 X^2 + b_6 X + c_6$ |
| (RESERVED) | (RESERVED) | UPPER LIMIT | |
| | | LOWER LIMIT | |
| : | : | UPPER LIMIT | |
| | | LOWER LIMIT | |

FIG.15

| ERROR DETECTION TIME | MONITORING POINT | | | MAIN VARIABLE POINT | |
|---|---|---|---|---|---|
| | POINT | LIMIT VALUE | DETECTED VALUE | POINT | DETECTED VALUE |
| 06/01/02 08:11 | POINT D | UPPER LIMIT 9.50 | 131.0 | POINT Z | 112 |
| 06/01/13 23:02 | POINT D | LOWER LIMIT 2.00 | 1.23 | POINT Z | 48 |
| 06/01/20 07:23 | POINT A | UPPER LIMIT 2.00 | 214.7 | POINT Y | 309 |
| : | : | : | : | : | : |

FIG.16

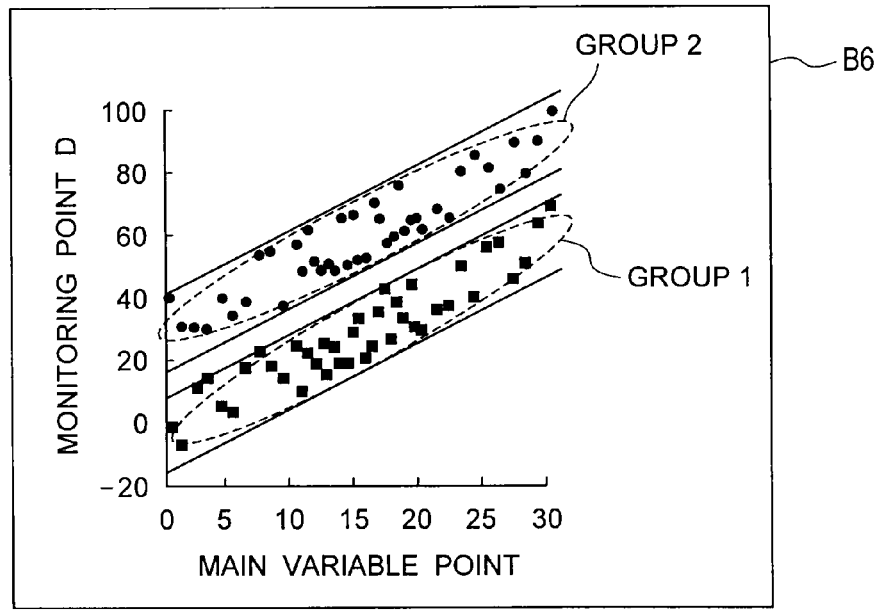

FIG.21

| Y | X | GROUPING CONDITION | GROUP | FUNCTION | |
|---|---|---|---|---|---|
| POINT A | POINT Y | POINT C > $\alpha$ | 1 | UPPER LIMIT | $Y = a_1X^2 + b_1X + c_1$ |
| | | | | LOWER LIMIT | $Y = a_2X^2 + b_2X + c_2$ |
| | | POINT C $\leq \alpha$ | 2 | UPPER LIMIT | $Y = 11X^2 + m_1X + n_1$ |
| | | | | LOWER LIMIT | $Y = 12X^2 + m_2X + n_2$ |
| POINT D | POINT W | POINT F = ON | 1 | UPPER LIMIT | $Y = a_3X^2 + b_3X + c_3$ |
| | | | | LOWER LIMIT | $Y = a_4X^2 + b_4X + c_4$ |
| | | POINT F = OFF | 2 | UPPER LIMIT | $Y = 13X^2 + m_3X + n_3$ |
| | | | | LOWER LIMIT | $Y = 14X^2 + m_4X + n_4$ |
| POINT D | POINT Z | $\beta \leq$ POINT G $\leq \varepsilon$ | 1 | UPPER LIMIT | $Y = a_5X^2 + b_5X + c_5$ |
| | | | | LOWER LIMIT | $Y = a_6X^2 + b_6X + c_6$ |
| | | $\beta >$ POINT G<br>$\varepsilon <$ POINT G | 2 | UPPER LIMIT | $Y = 15X^2 + m_5X + n_5$ |
| | | | | LOWER LIMIT | $Y = 16X^2 + m_6X + n_6$ |
| : | : | : | : | UPPER LIMIT | |
| | | | | LOWER LIMIT | |

FIG.22

PLANT OPERATION DATA MONITORING APPARATUS

BACKGROUND OF THE INVENTION

1. Field of the Invention

The present invention relates to a plant operation data monitoring apparatus for detecting an error by monitoring plant data.

2. Related Art

In order to detect a plant error in a power plant, a point (sensor value) to be monitored is specified in advance and the presence or absence of a plant error is determined by comparing a specified fixed upper/lower limit and most recent plant data to see whether the limit is exceeded (see Japanese Patent Laid-Open No. 05-120582). Further, a technique has been introduced, which the limit is calculated by using an average value, a standard deviation and the like of historical plant data in a monitoring point to improve the accuracy of detecting a plant error (see Japanese Patent Application No. 2004-346716).

Unfortunately, according to the aforementioned prior art, when a plant operating state (activating, loading up, terminating, or the like) is changed, a value at a monitoring point may exceed the upper/lower limit to be used to detect a plant error in spite of a normal operation state, and an operator may be informed of a false alarm.

Therefore, there is a problem in that it takes knowledge of a skilled plant operator to determine an optimum upper/lower limit, or it takes time and efforts such as repeating a plant test operation and changing limit values many times.

SUMMARY OF THE INVENTION

In view of the above problems, the present invention has been made and an object of the present invention is to provide a plant operation data monitoring apparatus capable of monitoring a plant error with a high accuracy without requiring a skilled operator.

In order to achieve the above object, the present invention provides a plant operation data monitoring apparatus including:

plant-data inputting means for fetching plant data from each sensor installed in a plant facility;

a plant-data most-recent-value table for temporarily storing a most recent value of said plant data;

plant-data recording means for retrieving said most recent value from said plant-data most-recent-value table and storing long-term time-series plant data in a plant-data history table;

monitoring point editing means for registering one or more monitoring points used to monitor an error of said plant facility in response to an operator request;

a monitoring-point registering table for storing a result registered by said monitoring-point editing means;

data-correlation determining means for selecting one or more main variable points having a strong correlation from said plant-data history table using said monitoring point as a key;

a main-variable-point registering table for registering a main variable point selected by said data-correlation determining means;

limit-value calculating means for defining a statistical upper/lower limit value function of said plant-data history table on the basis of time-series plant data of said monitoring point and said main variable point;

a limit-value function table for storing a limit-value function defined by said limit-value calculating means;

limit-value determining means which refers to table information in said limit-value function table and periodically matches content of said plant-data most-recent-value table; and if the most recent value is outside the limit value range, deviation information is stored in a determination result table;

plant-error monitoring/outputting means for outputting an error signal and content of said determination result table if a new plant error occurs; and a display device for displaying an output from said plant-error monitoring/outputting means.

As described above, according to the present invention, a statistical technique is used to automatically select a monitoring point for monitoring the amount of variation of plant data subject to plant monitoring and a main variable point which has a strong correlation to the monitoring point and which is appropriate for monitoring a plant error. These monitoring points are incorporated in a plant monitoring conditions. Accordingly, the present invention can provide a monitoring apparatus capable of monitoring a plant error with a high accuracy without requiring a skilled operator.

BRIEF DESCRIPTION OF THE DRAWINGS

FIG. 12 is an explanatory drawing showing a configuration example of a plant history data table in the Embodiment 1 in accordance with the present invention;

FIG. 13 is an explanatory drawing showing a configuration example of a monitoring-point registering table in the Embodiment 1 in accordance with the present invention;

FIG. 14 is an explanatory drawing showing a configuration example of a main-variable-point registering table in the Embodiment 1 in accordance with the present invention;

FIG. 15 is an explanatory drawing showing a configuration example of a limit-value function table in the Embodiment 1 in accordance with the present invention;

FIG. 16 is an explanatory drawing showing a configuration example of a determination result table in the Embodiment 1 in accordance with the present invention;

FIG. 21 is an explanatory drawing showing an example of setting upper/lower limit values by a plurality of groups in the Embodiment 4 in accordance with the present invention;

FIG. 22 is an explanatory drawing showing a configuration example of a limit value function table (with a group division condition) in the Embodiment 5 in accordance with the present invention;

DETAILED DESCRIPTION OF THE INVENTION

Hereinafter, embodiments of the plant operation data monitoring apparatus in accordance with the present invention will be described with reference to accompanying drawings.

EMBODIMENT 1

The configuration of an Embodiment 1 in accordance with the present invention will be described with reference to FIG. 1; and the data structure related to the Embodiment 1 will be described with reference to FIGS. 10 to 16.

(Configuration)

Figure 1:
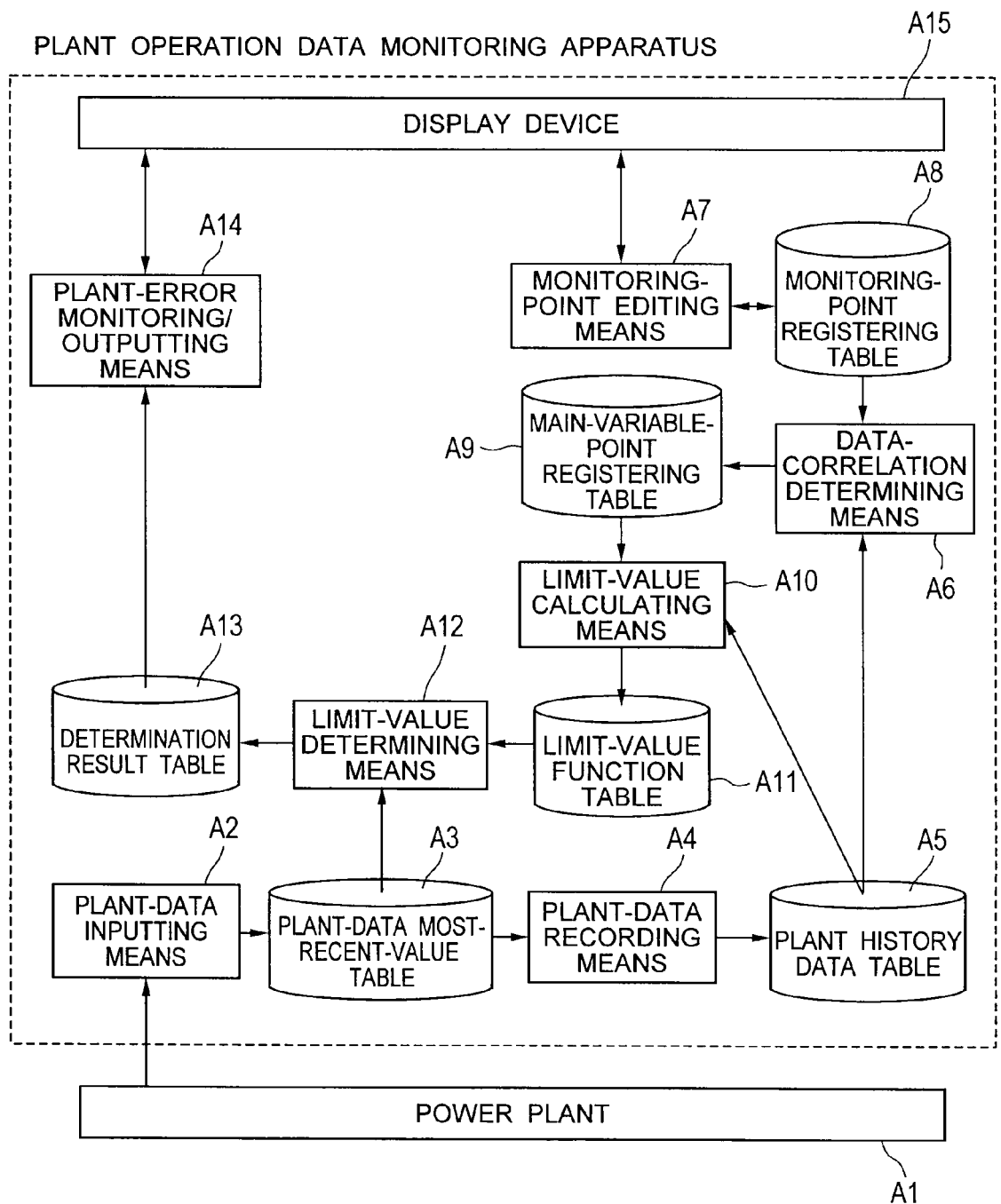
FIG. 1 shows a configuration of an Embodiment 1 in accordance with the present invention.

FIG. 1 shows a monitoring apparatus which determines whether the most recent value for various state amounts in a power plant is appropriate in comparison with a historical data range.

The monitoring apparatus is provided with plant-data inputting means A2 which periodically fetches plant data from each sensor installed in a power facility of a power plant A1. Time information and an instantaneous value are written from the plant-data inputting means A2 to a plant-data most-recent-value table A3 (FIG. 11).

Further, a plant-data recording means A4 periodically reads the content of the plant-data most-recent-value table A3 and writes long-term time-series plant data into a plant history data table A5 (FIG. 12).

A monitoring-point editing means A7 resisters operator-specified one or more plant-error monitoring points in a monitoring-point registering table A8 (FIG. 13) through a display device A15 provided with a display, a mouse, and a keyboard.

Figures 10, 11:
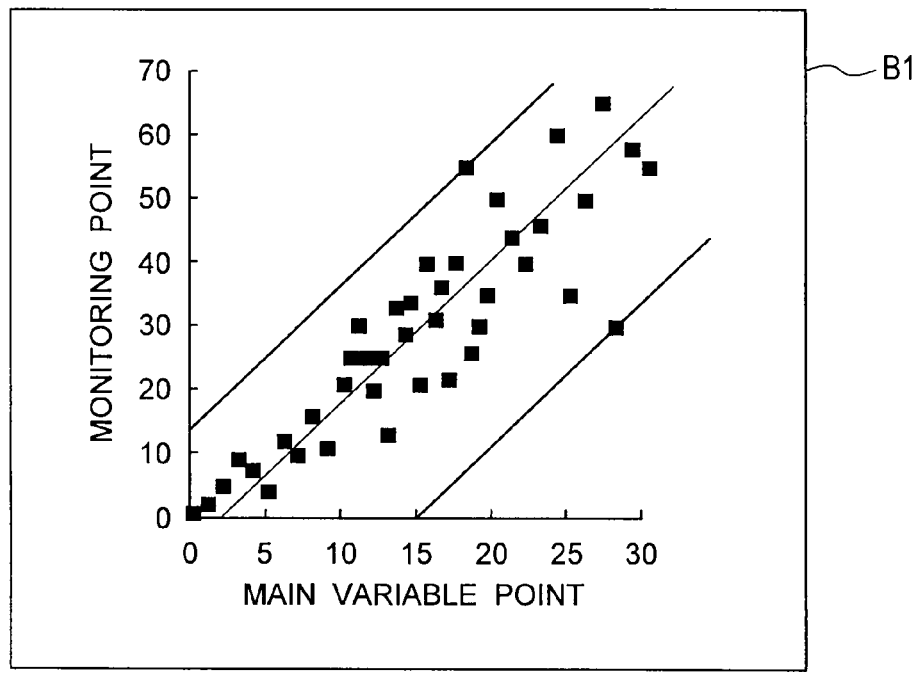
FIG. 10 is an explanatory drawing showing an example of data distribution having a strong correlation in the Embodiment 1 in accordance with the present invention.
FIG. 11 is an explanatory drawing showing a configuration example of a plant-data most-recent-value table in the Embodiment 1 in accordance with the present invention.

As a result, a data-correlation determining means A6 uses a statistical process to automatically extract one or more main variable points having a strong correlation ($0.9 < $ correlation factor $R \leq 1.0$) as shown in FIG. 10 to a registered monitoring point by referring to time-series plant data in the plant history data table A5 and then stores the extracted main variable point as a main variable point in a main-variable-point registering table A9 (FIG. 14).

A limit-value calculating means A10 reads historical plant data about a monitoring point and a main variable point from the plant history data table A5 by referring to the main-variable-point registering table A9. Then the limit-value calculating means A10 calculates a statistical upper/lower limit of the monitoring point as a function ($y = aX^2 + bX + c$) of the main variable point and stores in a limit-value function table A11 (FIG. 15).

A limit-value determining means A12 periodically reads the most recent value data in a monitoring point and a main variable point from the plant-data most-recent-value table A3 and determines whether the most recent value is within a range of a statistical upper/lower limit function stored in the limit-value function table A11.

If the most recent value exceeds the upper/lower limit range, the limit-value determining means A12 stores the time of exceeding the upper/lower limit range and the detected value of that time in a determination result table A13 (FIG. 16). A plant-error monitoring/outputting means A14 periodically reads the state stored in the determination result table A13 and when a new error is detected, the plant error detection is reported to the display device A15. The plant-error monitoring/outputting means A14 outputs the content stored in the determination result table A13 to the display device A15 in response to an operator request from the display device A15.

(Operation)

First, the operator uses the display device A15 to register an error monitoring point of the power plant through the monitoring-point editing means A7. Then, the data-correlation determining means A6 uses the time-series plant data in the plant history data table A5 to automatically select a main variable point having a strong correlation.

Then, the limit-value calculating means A10 calculates a statistical upper/lower limit of a monitoring point as a function of a main variable point and the limit-value determining means A12 compares the periodical most recent plant data to detect a plant error. This enables monitoring of a dynamically varying plant.

(Advantage)

As described above, according to the Embodiment 1, even if the operator is not a skilled plant operation technician, the operator can set a statistical upper/lower limit optimum for a plant operation state to a plant error monitoring point. Accordingly, it is possible to increase the plant monitoring accuracy without dependence on the operator's skill.

EMBODIMENT 2

The configuration of an Embodiment 2 in accordance with the present invention will be described with reference to FIG. 2; and the data processing related to the Embodiment 2 will be described with reference to FIGS. 17 to 19.

(Configuration)

Figure 2:
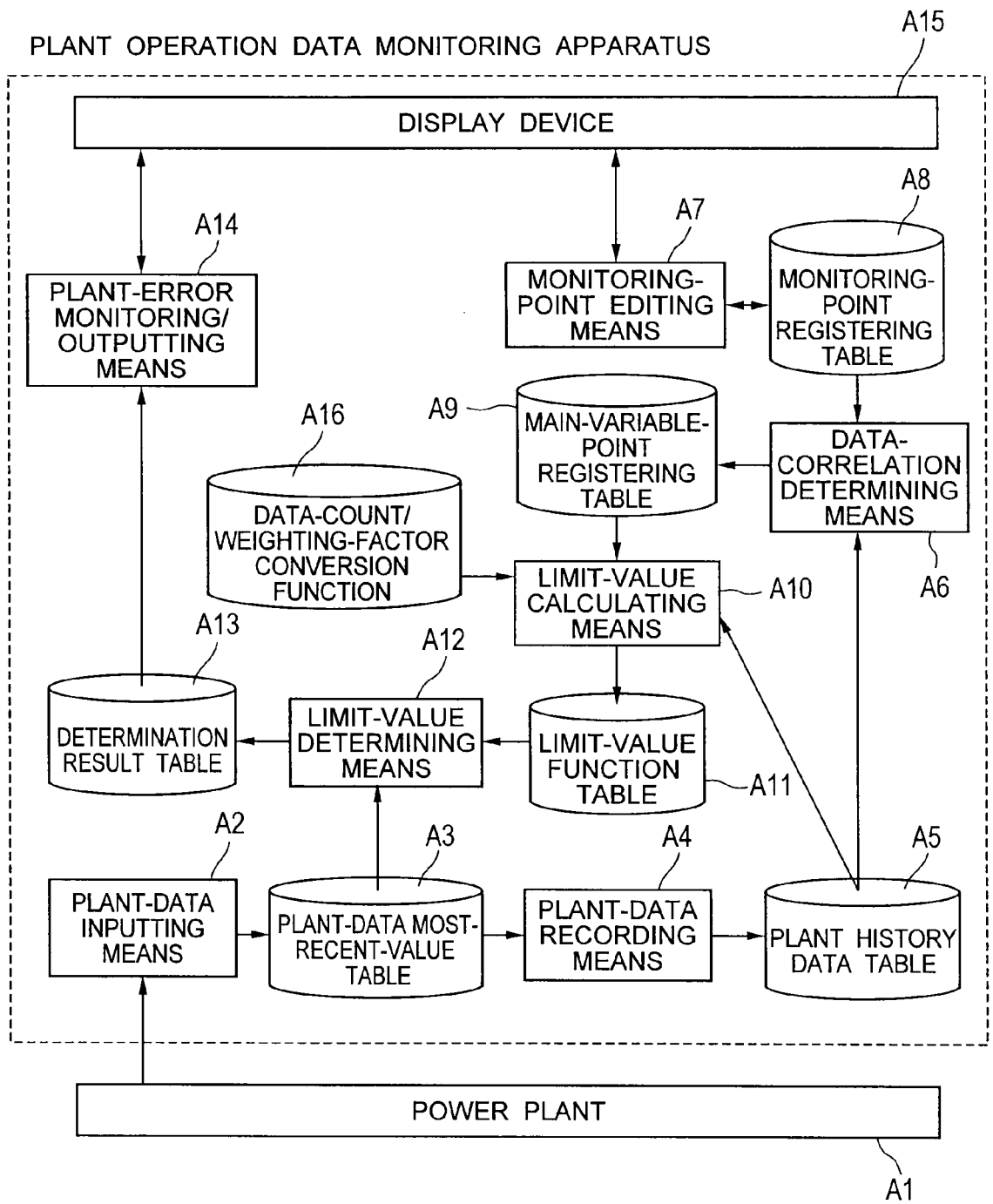
FIG. 2 shows a configuration of an Embodiment 2 in accordance with the present invention.

As shown in FIG. 2, the Embodiment 2 adds to the Embodiment 1 a data-count/weighting-factor conversion function A16 which is used by the limit-value calculating means A10 to calculate a statistical upper/lower limit.

(Operation)

Figure 17:
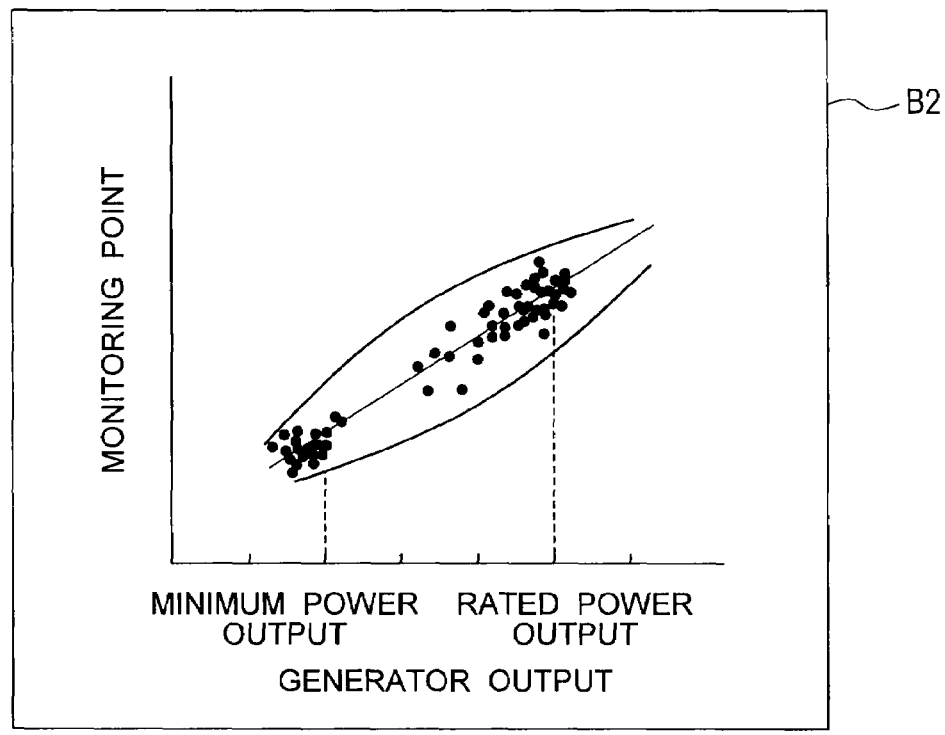
FIG. 17 is an explanatory drawing showing an example of data distribution having a tendency to converge on a specific area in the Embodiment 2 in accordance with the present invention.
Figure 18:
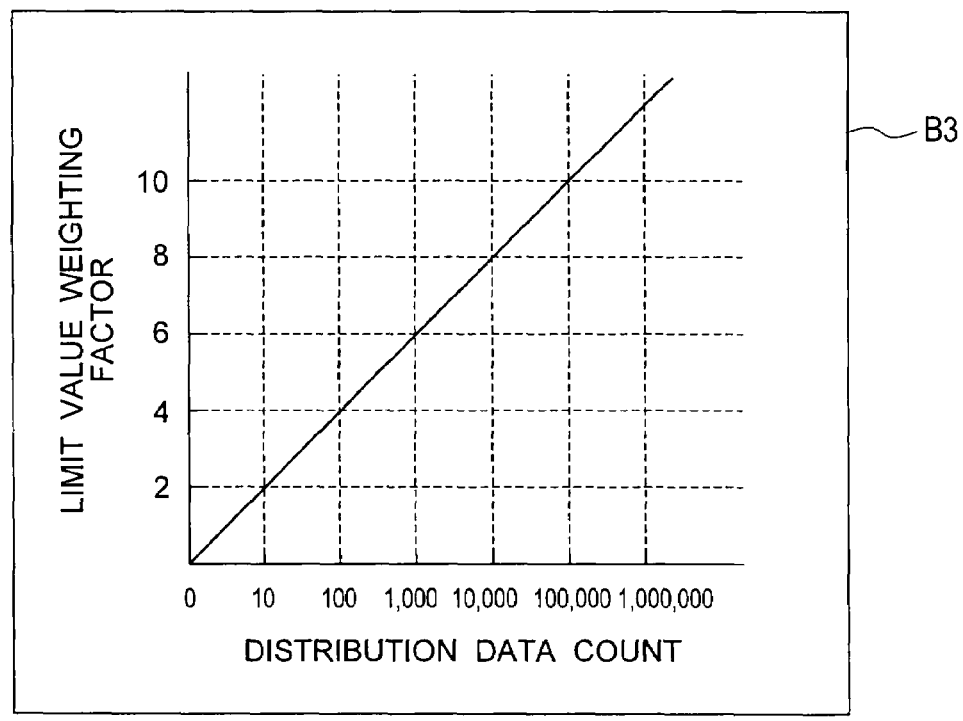
FIG. 18 is an explanatory drawing showing an example of a conversion function between a distribution data count and a limit value weighting factor in the Embodiment 2 in accordance with the present invention.

With reference to FIG. 2, when the limit-value calculating means A10 calculates the statistical upper/lower limit of monitoring points and main variable points from the historical plant data, data tends to converge, for example, at or near the minimum power output and the rated power output at a particular main variable point, for example in a generator output as shown in FIG. 17. Therefore, the statistical upper/lower limit in a few-data area contains a smoothing error.

Figure 19:
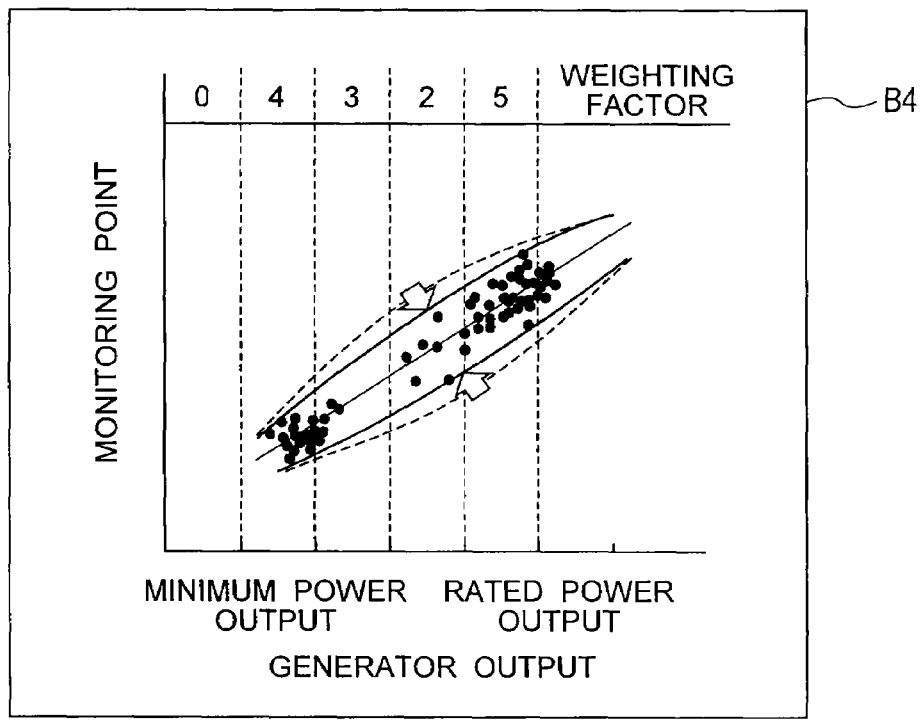
FIG. 19 is an explanatory drawing showing an example of optimization of an upper/lower limit range by a weighting factor in the Embodiment 2 in accordance with the present invention.

As shown in FIG. 19, main variable points are divided into a plurality of clusters, and the number of data points in a cluster range is counted. Then, the data-count/weighting-factor conversion function A16 (FIG. 18) is used to calculate the weighting factors which are used to determine the upper/lower limit range from a regression line.

(Advantage)

As described above, according to the Embodiment 2, when the statistical upper/lower limit of monitoring points and main variable points is calculated, an optimum upper/lower limit range can be obtained as shown in FIG. 19 by performing a limit calculation based on a data distribution density in units of divided clusters, thereby increasing the accuracy of plant error monitoring.

EMBODIMENT 3

Figure 20:
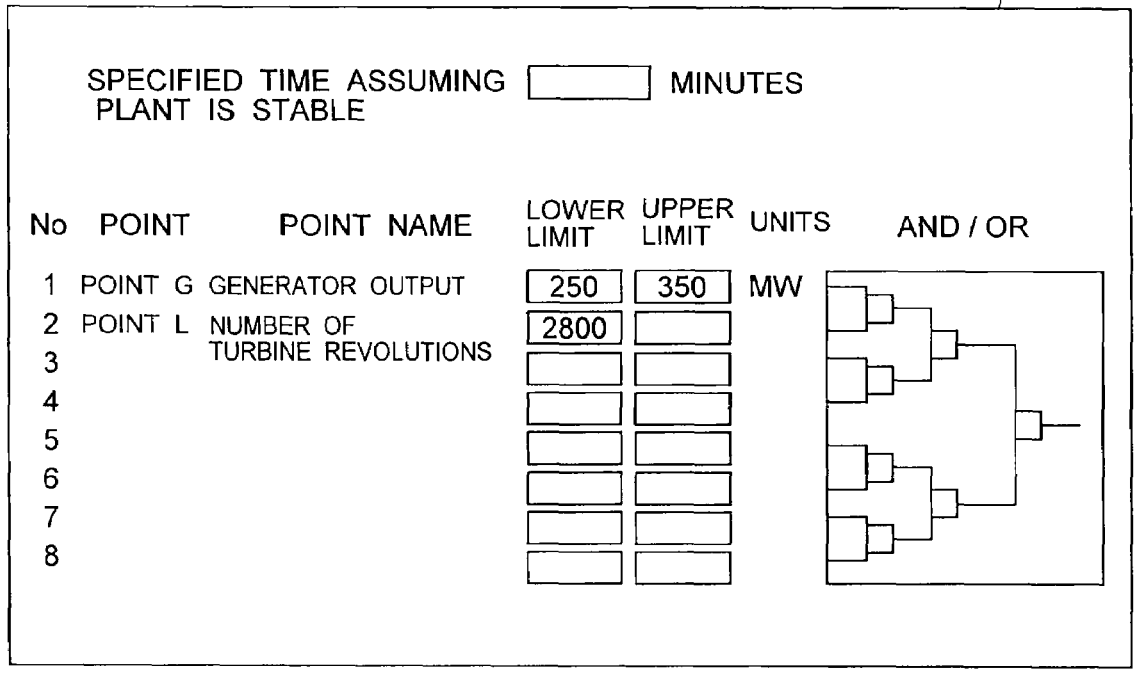
FIG. 20 is an explanatory drawing showing an example of a plant stability condition in the Embodiment 3 in accordance with the present invention.

The configuration of an Embodiment 3 in accordance with the present invention will be described with reference to FIG. 3; and the operation will be described with reference to FIG. 20.

(Configuration)

Figure 3:
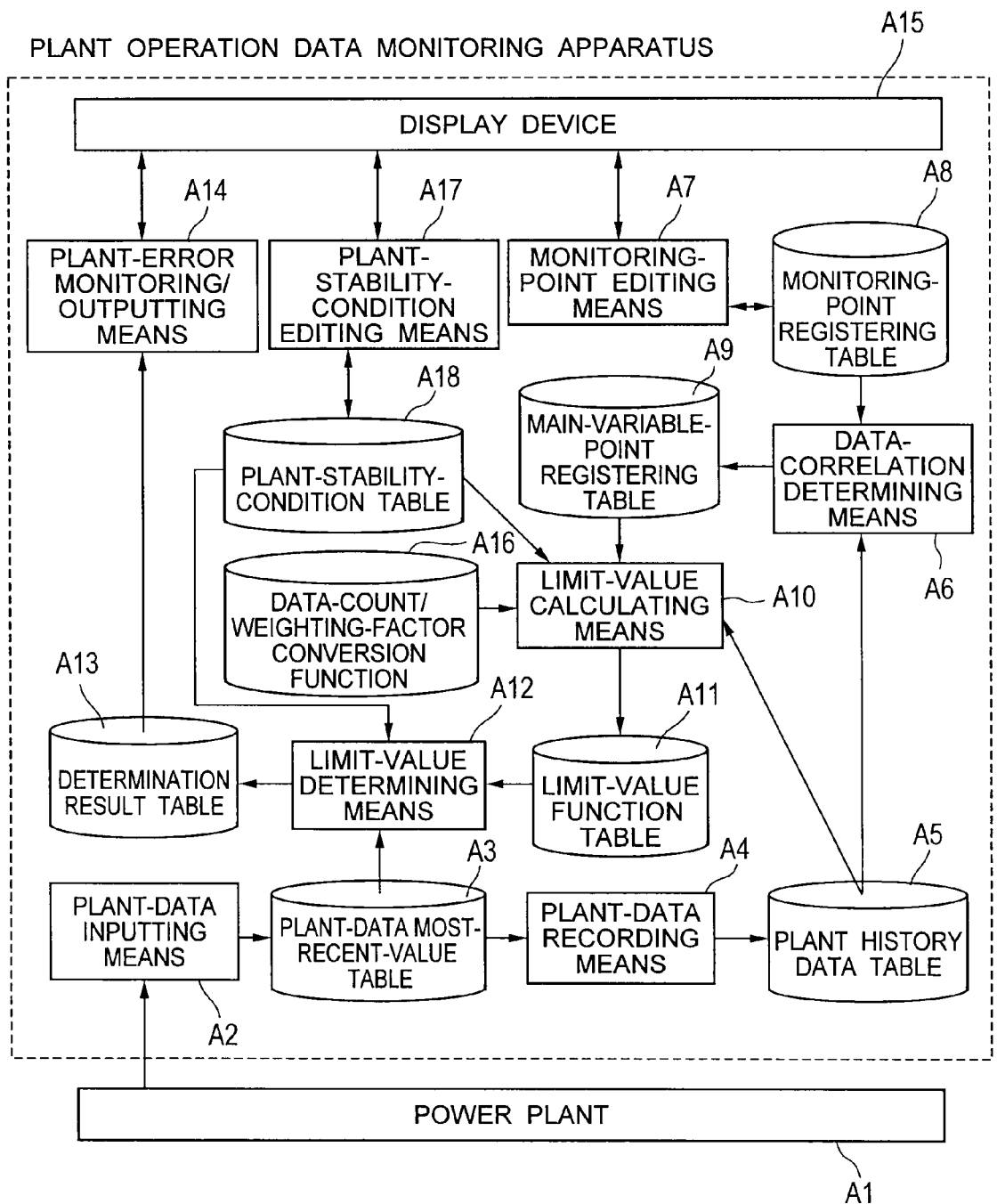
FIG. 3 shows a configuration of an Embodiment 3 in accordance with the present invention.

As shown in FIG. 3, the Embodiment 3 in accordance with the present invention adds to the Embodiments 1 and 2 plant-stability-condition editing means A17 for editing a plant stability condition indicating that a plant value is within a certain range at least for a certain period of time through the display device A15 and a plant-stability-condition table A18 for storing the condition.

(Operation)

According to the Embodiment 3 shown in FIG. 3, when an operator sets on the display device A15 a plant stability condition (FIG. 20) indicating that a plant value is within a certain range at least for a certain period of time, the plant-stability-condition editing means A17 stores the condition in the plant-stability-condition table A18.

The limit-value calculating means A10 extracts the historical data satisfying the condition, and calculates the statistical upper/lower limit based on less varying data. Further, the limit-value determining means A12 refers to the condition and performs monitoring check only if the condition is satisfied.

(Advantage)

As described above, according to the Embodiment 3, it is possible to increase the accuracy of calculating the statistical upper/lower limit of monitoring points and main variable points and to perform plant monitoring by preventing a false alarm from occurring due to varying data.

EMBODIMENT 4

The configuration of an Embodiment 4 in accordance with the present invention will be described with reference to FIG. 4; and the data processing will be described with reference to FIG. 21.

(Configuration)

Figure 4:
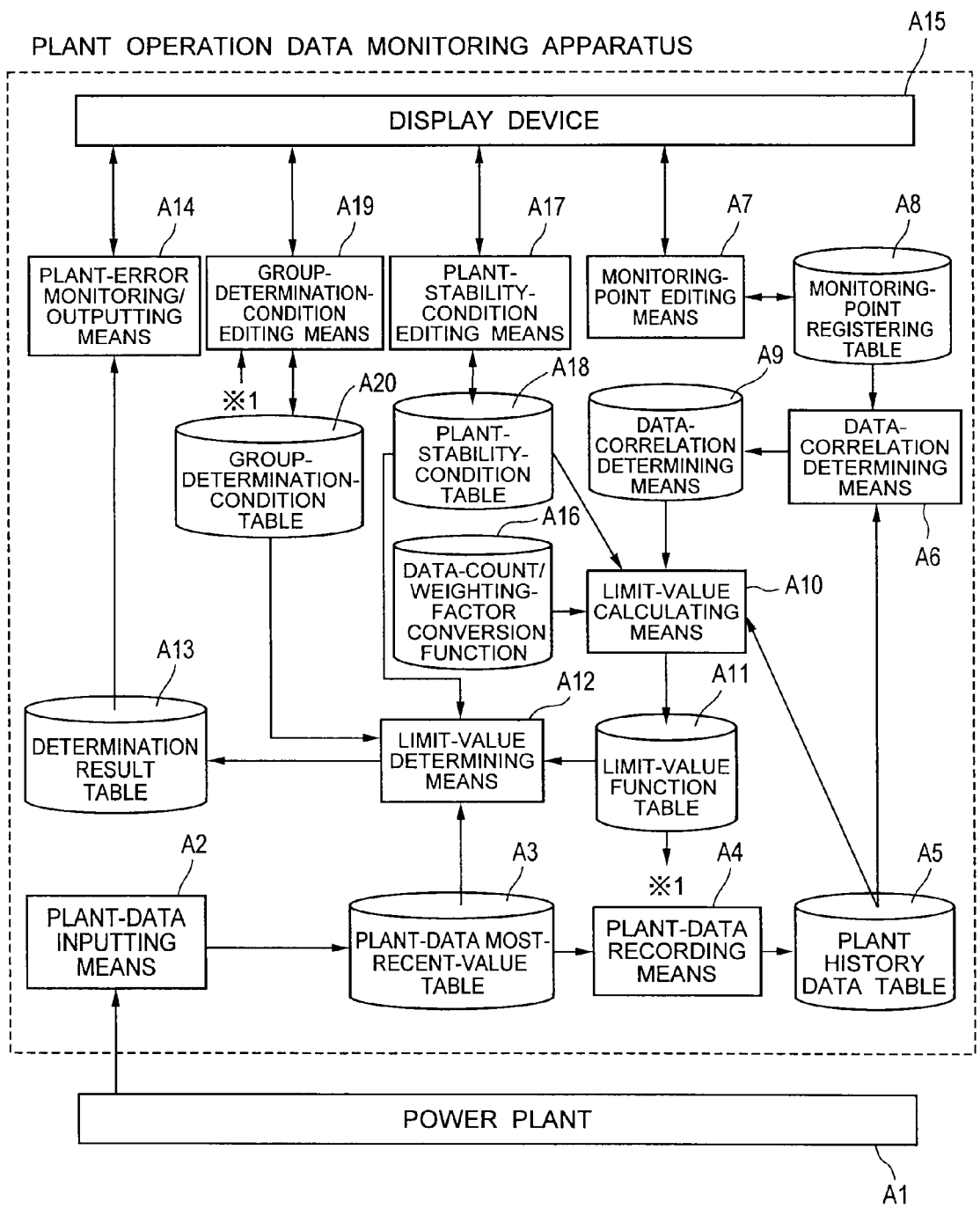
FIG. 4 shows a configuration of an Embodiment 4 in accordance with the present invention.

The Embodiment 4 of the present invention adds group-determination-condition editing means A19 and a group-determination-condition table A20, as shown in FIG. 4. In other words, as shown in FIG. 21, if data distribution showing a correlation between monitoring points and main variable points is divided into two or more groups (data set) in the Embodiments 1 to 3, the operator can perform editing by the group-determination-condition editing means A19 and the group-determination-condition table A20 through the display device A15.

(Operation)

As shown in FIG. 21, the historical data shows that the data distribution showing a correlation between monitoring points and main variable points is divided into two or more groups, the group-determination-condition editing means A19 reads a plurality of statistical upper/lower limit values calculated against monitoring points from the limit-value function table A11 (*1 in FIG. 4) and displays them on the display device A15.

When the operator sets a condition to distinguish the plurality of statistical upper/lower limit values (e.g., selects group 1 if the ambient temperature is equal to or higher than 10° C., and selects group 2 if the ambient temperature is lower than 10° C.), the set condition is stored in the group-determination-condition table A20.

During the periodical monitoring checking, the limit-value determining means A12 matches the condition with the most recent plant data value to find a statistical upper/lower limit value satisfying the condition for checking. Therefore, according to the Embodiment 4, if a two-dimensional distribution of monitoring points and main variable points is combined into a single group, the statistical upper/lower limit range contains a large error.

(Advantage)

According to the Embodiment 4, the distribution is divided into a plurality of groups each having a different distribution depending on the plant operation condition, and a selection condition is added for each group. This allows an appropriate statistical upper/lower limit value to be selected depending on the plant operation state, thereby increasing the accuracy of monitoring the plant.

EMBODIMENT 5

(Configuration)

Hereinafter, the Embodiment 5 of the present invention will be described. It should be noted that the description is omitted since the configuration of the Embodiment 5 is the same as that of the Embodiment 3 except the structure of the limit-value function table A11.

(Operation)

The data processing of the Embodiment 5 will be described with reference to FIG. 22. As described in the Embodiment 4, if the data distribution showing the correlation between monitoring points and main variable points is divided into two or more groups (data set), the limit-value calculating means A10 instead of the operator uses the history data in the plant history data table A5 to apply a data mining method or the like. Then, the most appropriate condition is automatically extracted from a plurality of statistical upper/lower limit values and is stored in the limit-value function table A11-2 (FIG. 22).

(Advantage)

Therefore, according to the Embodiment 5, further to the Embodiment 4, an optimum group selection condition is automatically calculated on the basis of the tendency of the history data without requiring an operator's decision. This can not only reduce the burden of the operator, but also can select an accurate statistical upper/lower limit value according to the plant state, and increase the plant monitoring accuracy.

EMBODIMENT 6

The configuration of an Embodiment 6 in accordance with the present invention will be described with reference to FIG. 5; and the data processing will be described with reference to FIG. 23.

(Configuration)

Figure 5:
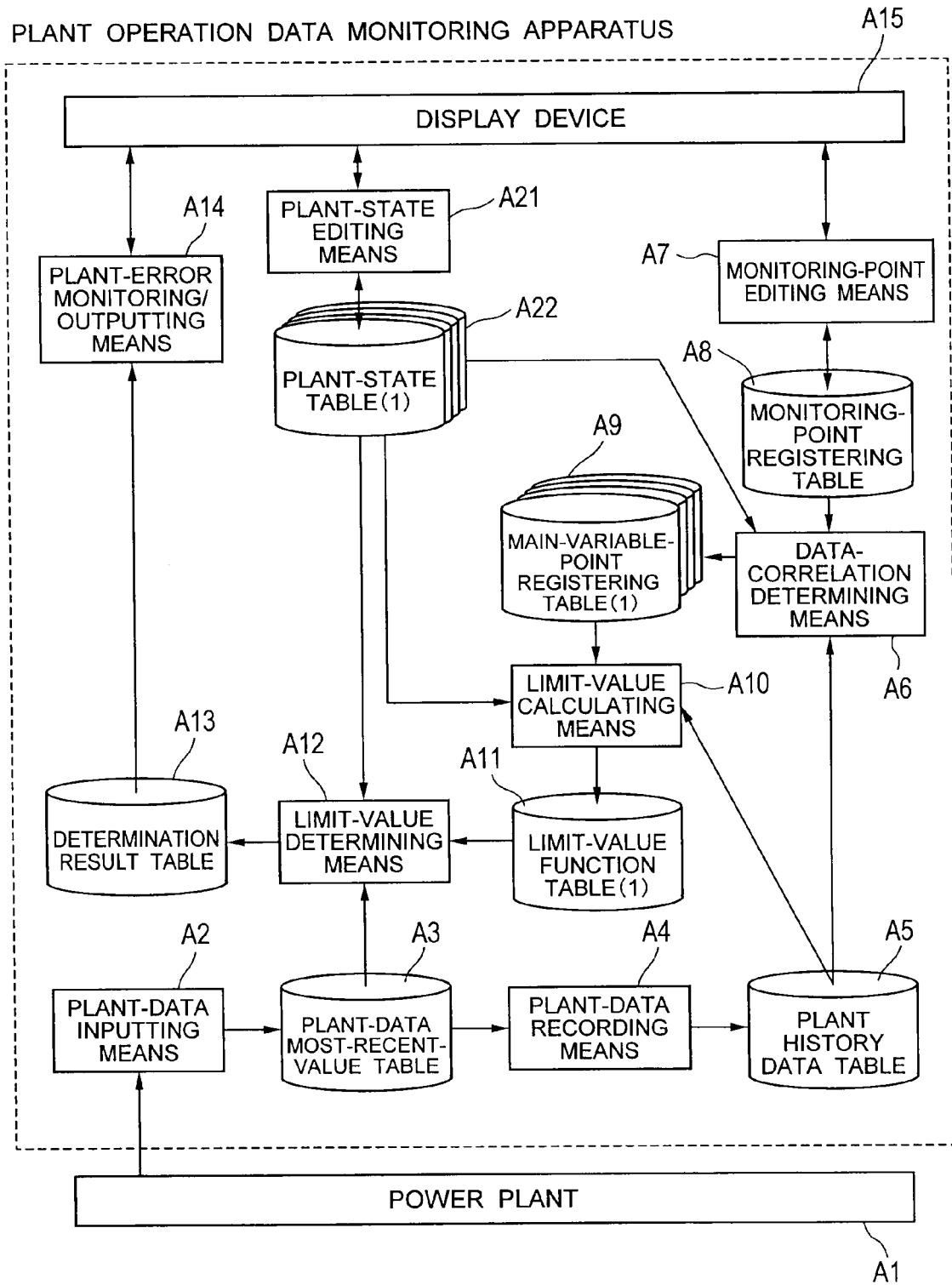
FIG. 5 shows a configuration of an Embodiment 6 in accordance with the present invention.

As shown in FIG. 5, the Embodiment 6 adds to the Embodiment 1, plant-state editing means A21 by which the operator sets a plurality of plant states through the display device A15, and plant-state tables A22 (1) to (n) in which each of the set plant states is stored, as well as the main-variable-point registering tables A9 (1) to (n) corresponding to each of the plurality of plant states and the limit-value function tables A11 (1) to (n).

(Operation)

When the operator sets a plurality of plant states (1) to (n) to one of the monitoring points stored in the monitoring-point registering table A8 through the display device A15 in FIG. 5, the plant-state editing means A21 stores the set information to the plant-state tables A22 (1) to (n) in units of plant states.

The data-correlation determining means A6 automatically extracts one or more main variable points having a strong correlation to a monitoring point in this plant state and stores them in the main-variable-point registering table A9 (1) to (n) for each plant state.

Figure 23:
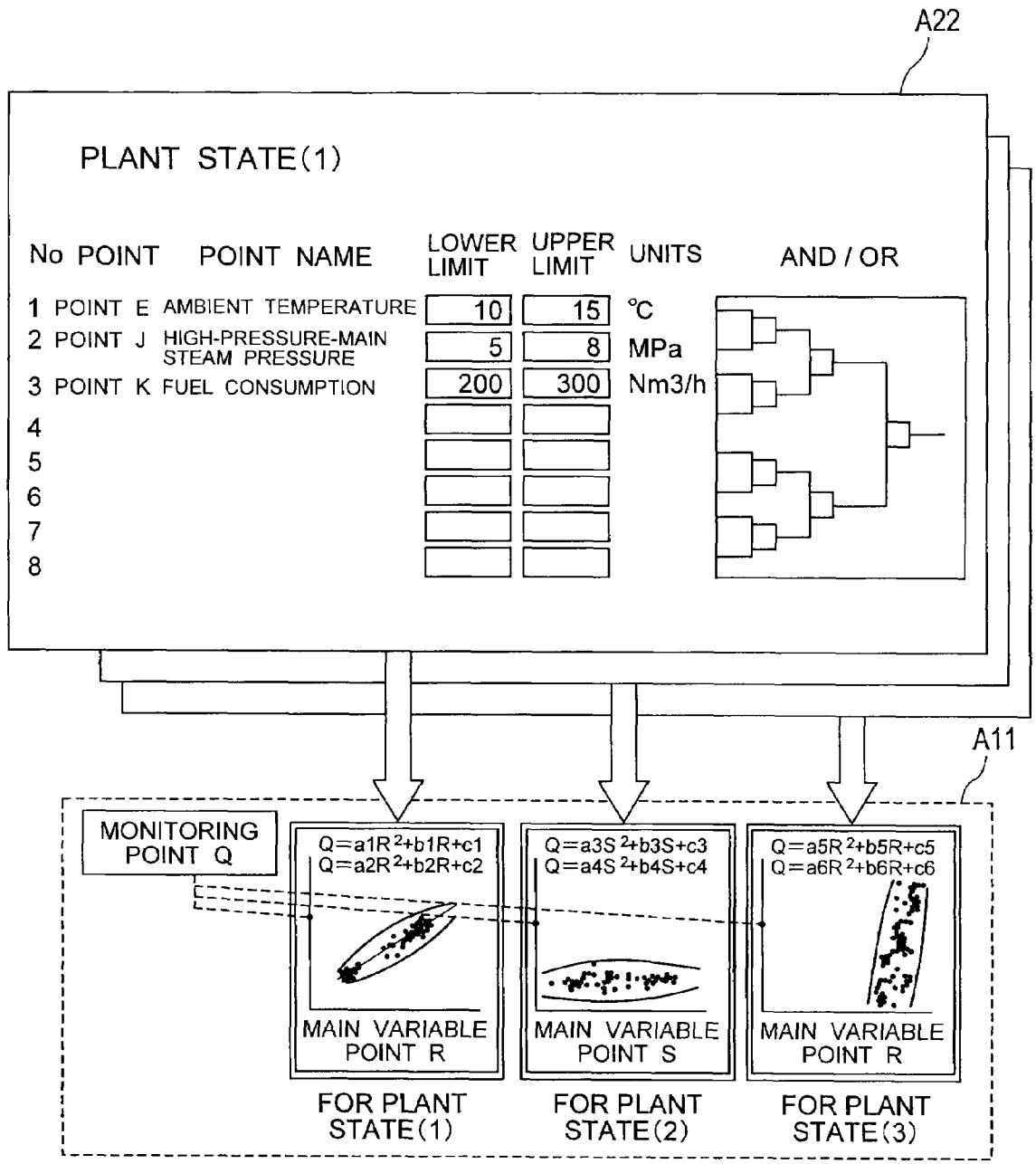
FIG. 23 is an explanatory drawing showing a configuration example of a plurality of plant states about a monitoring point and a limit value function table in the Embodiment 6 in accordance with the present invention.

As shown in FIG. 23, the limit-value calculating means A10 refers to the main-variable-point registering tables A9 (1) to (n) and plant-state tables A22 (1) to (n) to calculate the statistical upper/lower limit values of monitoring points for each plant state based on the history data as a plurality of functions for main variable points and stores them in limit-value function table A11 (1) to (n).

The limit-value determining means A12 periodically checks for the most recent value for the plant state and the plant data in the plant-state tables A22 (1) to (n). When the set plant state is established, the limit-value determining means A12 reads the limit-value function table A11 related to the plant state and performs monitoring by the statistical upper/lower limit.

(Advantage)

As described above, according to the Embodiment 6, when the operator specifies noteworthy several plant states, an appropriate main variable point corresponding to a monitoring point is automatically extracted according to the plant state to calculate the statistical upper/lower limit values, thereby enabling plant monitoring more adapted to a change of the plant operation.

EMBODIMENT 7

(Configuration)

Hereinafter, the Embodiment 7 of the present invention will be described. It should be noted that the description is omitted since the configuration of the Embodiment 7 is the same as that of the Embodiment 6.

(Operation)

With reference to FIG. 5, the data-correlation determining means A6 automatically extracts a monitoring point and a plurality of main variable points having a strong correlation under the conditions stored in the plant-state tables A22 (1) to (n) and further performs priority determination so that the main variable points should be the same even in a plurality of plant states and then calculates the statistical upper/lower limit.

For example, FIG. 23 shows three plant states and corresponding main variable points as follows:

Plant state (1) . . . main variable point R
Plant state (2) . . . main variable point S
Plant state (3) . . . main variable point R If a different main variable point having a strong correlation in a plant state is automatically extracted as shown above, main variable point S in plant state (2) is replaced with main variable point R so that the main variable point should be the same in every plant state, and then calculates the statistical upper/lower limit.

(Advantage)

As described above, according to the Embodiment 7, the same main variable point in a plurality of plant states is selected from among a plurality of main variable points having a strong correlation to a monitoring point. Although the number of main variable points to be selected tends to be large up to a maximum number of n, but the main variable point having priority can be used, thereby facilitating monitoring a plant tendency.

EMBODIMENT 8

(Configuration)

Figure 6:
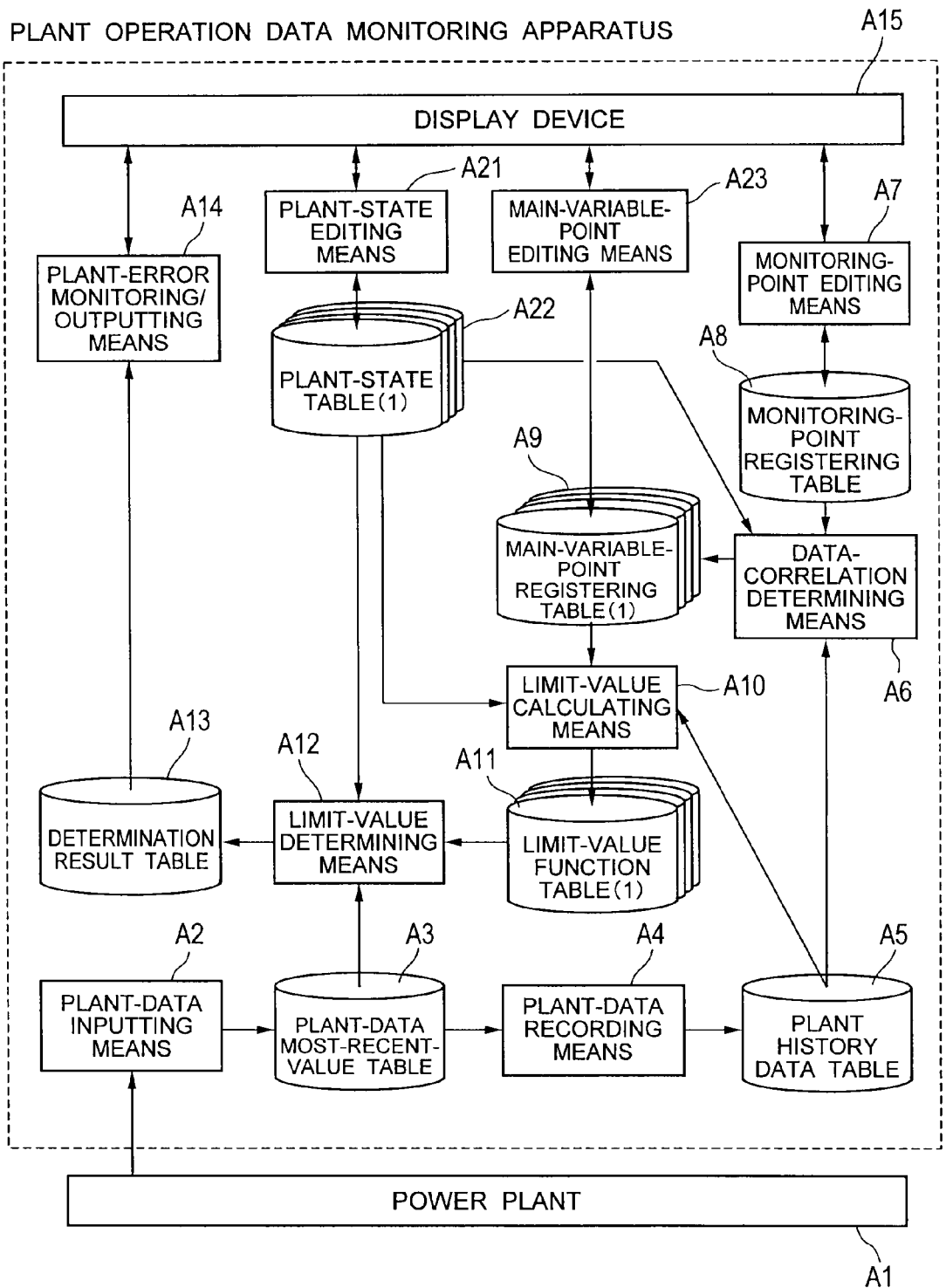
FIG. 6 shows a configuration of an Embodiment 8 in accordance with the present invention.

With reference to FIG. 6, the Embodiment 8 of the present invention will be described. As shown in FIG. 6, main-variable-point editing means A23 is newly added so that the operator can set a main variable point in the main-variable-point registering tables A9 (1) to (n) corresponding to a plurality of plant states through the display device A15.

(Operation)

As shown in FIG. 6, the main-variable-point editing means A23 can be used to set a main variable point in the main-variable-point registering tables A9 (1) to (n) corresponding to a plurality of plant states through the display device A15.

(Advantage)

As described above, according to the Embodiment 8, a main variable point can be manually set to a monitoring point. The operator can consciously set a combination of a monitoring point and a main variable point to calculate the statistical upper/lower limit for plant monitoring.

EMBODIMENT 9

(Configuration)

Hereinafter, the Embodiment 9 of the present invention will be described. It should be noted that the description is omitted since the configuration of the Embodiment 9 is the same as that of the Embodiment 6.

(Operation)

Figure 24:
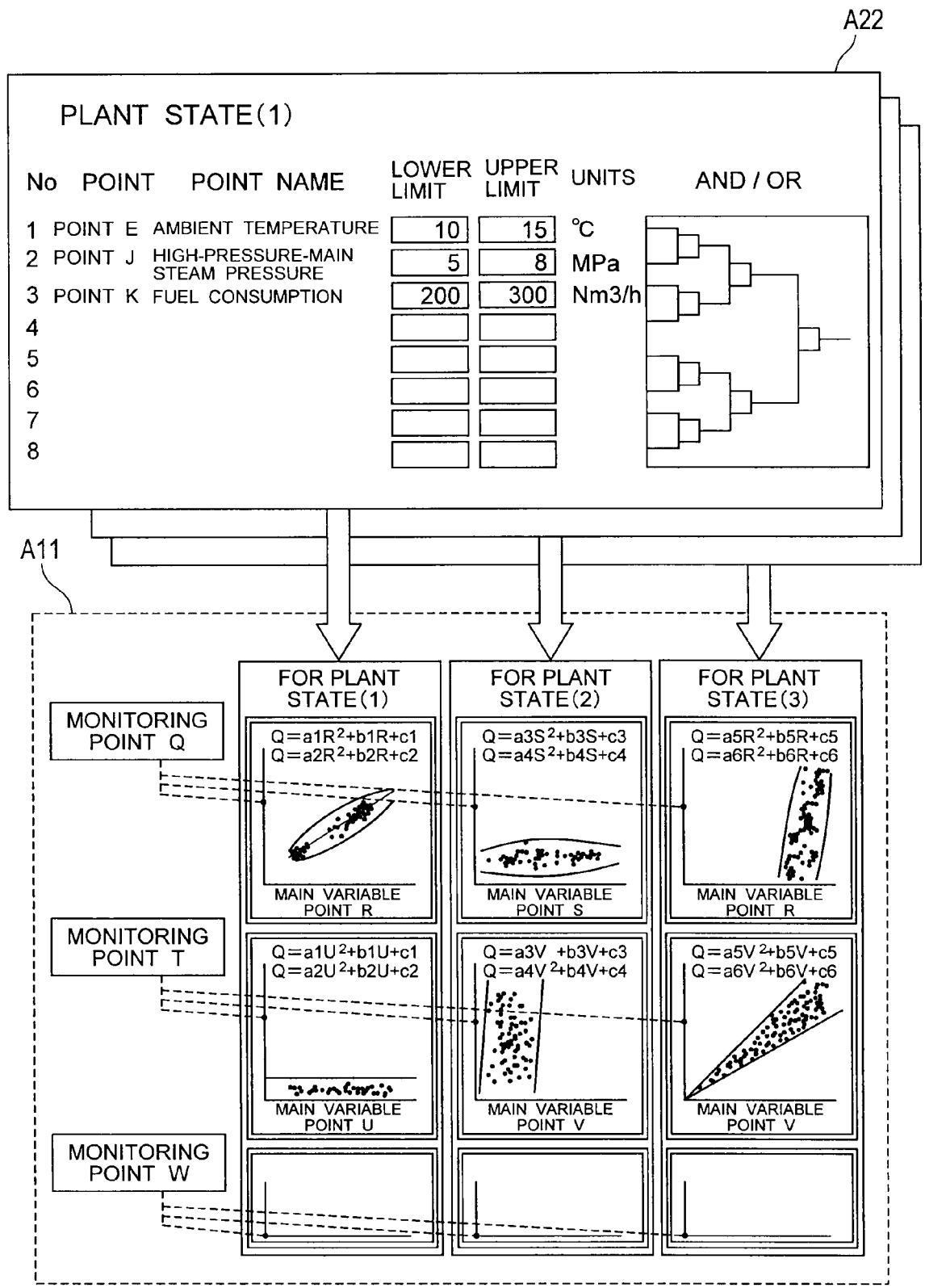
FIG. 24 is an explanatory drawing showing a configuration example of a limit value function table corresponding to a plurality of monitoring points in the Embodiment 9 in accordance with the present invention.

The data processing will be described with reference to FIG. 24. A plurality of monitoring points can be registered in the monitoring-point registering table A8 and the main-variable-point registering tables A9 (1) to (n) corresponding to a plurality of plant states in FIG. 6. The data-correlation determining means A6 selects at least one main variable point having a strong correlation for each plant state in units of monitoring points, and stores the main variable point in the main-variable-point registering tables A9 (1) to (n). As shown in FIG. 24, the limit-value calculating means A10 calculates the statistical upper/lower limit values about a plurality of monitoring points in units of plant states, and stores the limit values in limit-value function tables A11 (1) to (n).

(Advantage)

As described above, according to the Embodiment 9, a plurality of monitoring points can be registered, and thus, facility sensors at a plurality of locations can be simultaneously monitored, thereby increasing the sensitivity of multilateral plant monitoring.

EMBODIMENT 10

(Configuration)

Figure 7:
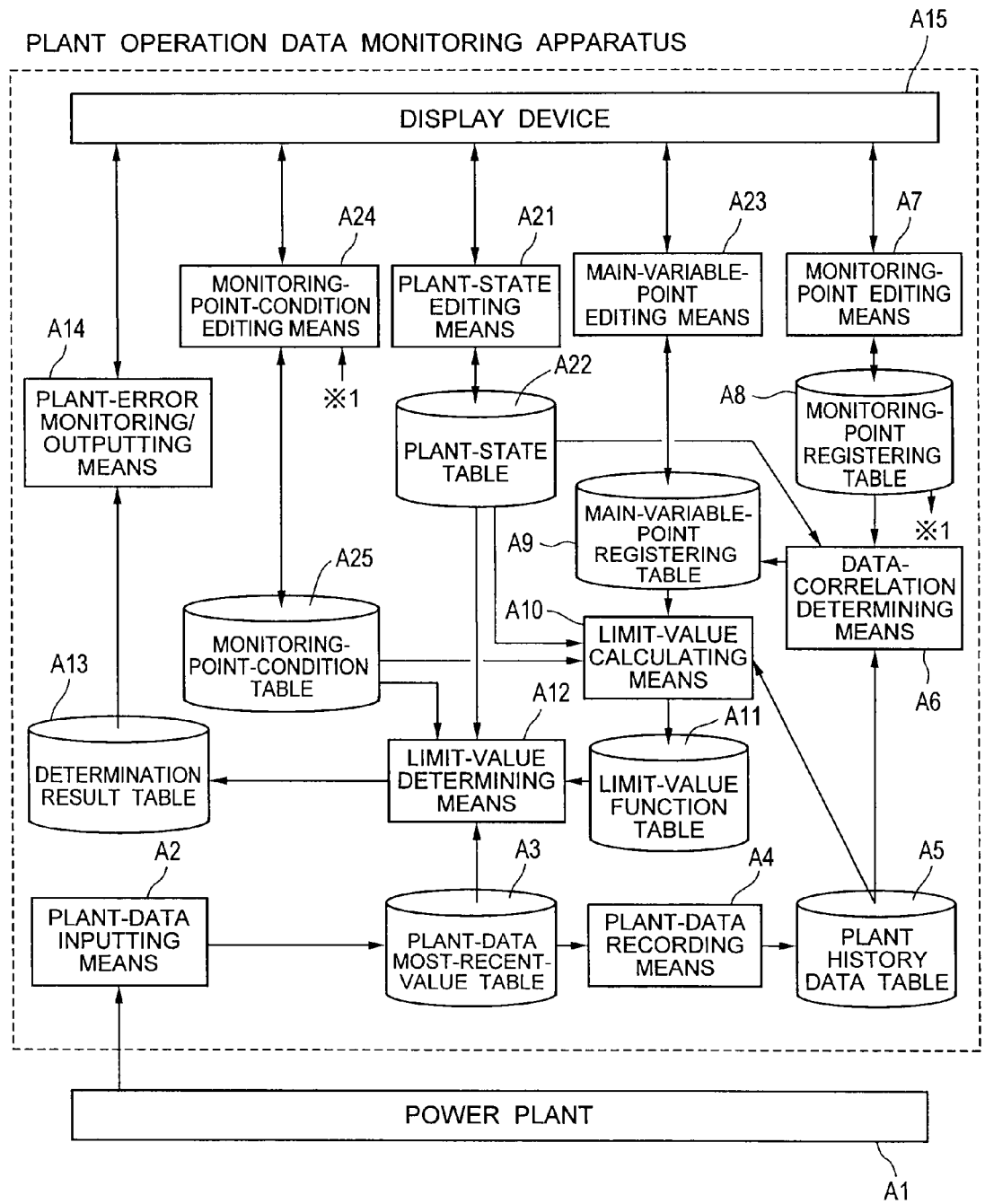
FIG. 7 shows a configuration of an Embodiment 10 in accordance with the present invention.

The Embodiment 10 of the present invention will be described with reference to FIG. 7. As shown in FIG. 7, monitoring-point-condition editing means A24 which can set a plant condition independently for each monitoring point and a monitoring-point-condition table A25 which stores the plant condition are newly added.

(Operation)

With reference to FIG. 7, information on a plurality of monitoring points stored in the monitoring-point registering table A8 by the monitoring-point editing means A7 is read by the monitoring-point-condition editing means A24 (*1 in FIG. 7). When the operator sets an individual plant condition for increasing monitoring sensitivity for each monitoring point, the set plant condition is stored in the monitoring-point-condition table A25.

The limit-value calculating means A10 uses the plant condition to calculate the statistical upper/lower limit with respect to a main variable point only by history data in the range of an individual plant condition for each monitoring point. If the condition is established, the limit-value determining means A12 performs monitoring checking.

In other words, there is a need of performing plant monitoring using only plant data under an individual plant condition by a monitoring point, and this plant condition differs depending the monitoring point.

(Advantage)

As described above, according to Embodiment 10, an individual plant condition can be set for each monitoring point. Therefore, it is possible to perform plant monitoring under a condition specified by the operator. It is also possible to remove missing data which may be a statistical outlier depending on the condition and data during test operation. Accordingly, it is possible to increase the accuracy of a statistical upper/lower limit and suppress an unnecessary false alarm.

EMBODIMENT 11

Figure 25:
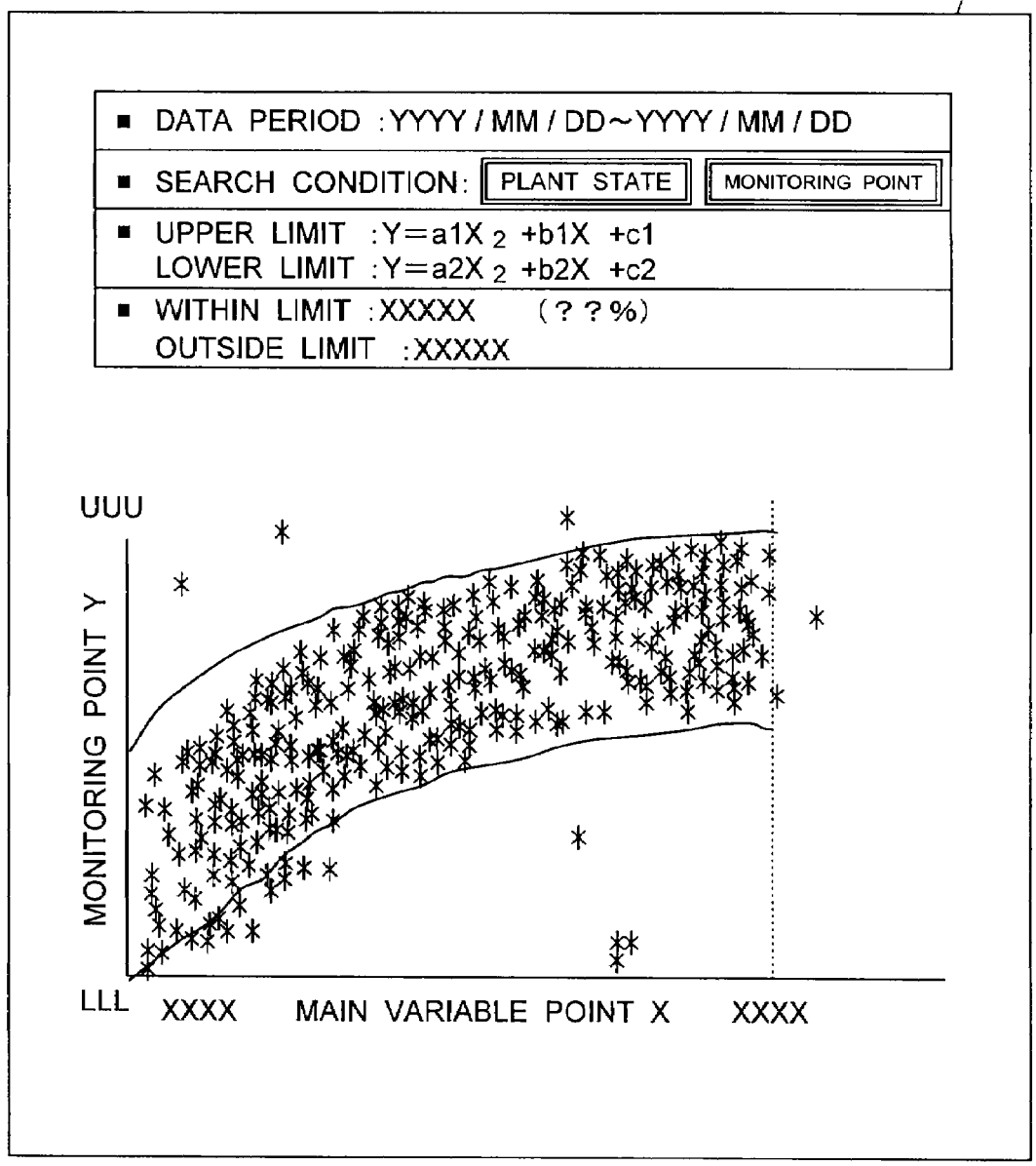
FIG. 25 is an explanatory drawing showing an example of plotting statistical upper/lower limit and history data on a same graph in the Embodiment 11 in accordance with the present invention.

The configuration of Embodiment 11 in accordance with the present invention will be described with reference to FIG. 8; and the data processing will be described with reference to FIG. 25.

(Configuration)

Figure 8:
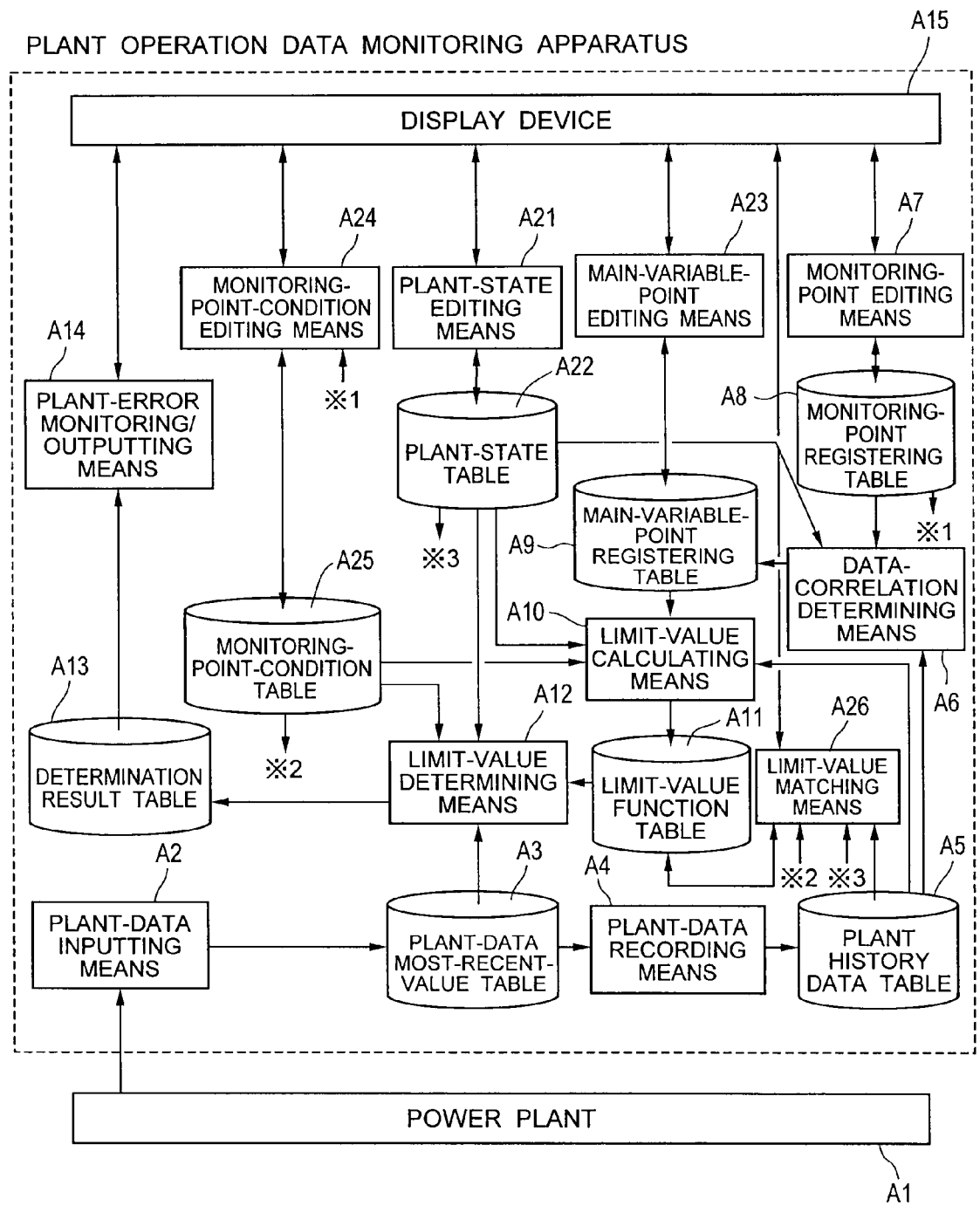
FIG. 8 shows a configuration of an Embodiment 11 in accordance with the present invention.

With reference to FIG. 8, limit-value matching means A26 is newly added, which reads statistical upper/lower limit values calculated by the limit-value calculating means A10 from the limit-value function table A11; extracts plant data used during calculation from the plant history data table A5 on the basis of the conditions in the monitoring-point-condition table A25 and the plant-state tables A22; performs overlay display data on a same graph; and displays data count within the upper/lower limit and outlier data count outside the upper/lower limit as well. It should be noted that *1, *2, and *3 indicate the same numbers are connected to each other in FIG. 8.

(Operation)

The limit-value matching means A26 reads from the limit-value function table A11 the statistical upper/lower limit values of monitoring points and main variable points calculated by the limit-value calculating means A10 on the basis of the conditions stored in the monitoring-point-condition table A25 and the plant-state tables A22 in FIG. 8; and further reads from the plant history data table A5 the plant data extracted during calculation on the basis of the same condition; and displays the upper/lower limit values and the plant data on the same graph through the display device A15. At this time, the limit-value matching means A26 calculates and displays the plant data count within the upper/lower limit and the data count outside the upper/lower limit as well (FIG. 25).

It should be noted that the graph display screen has means for displaying a history data search period when the statistical upper/lower limit is calculated and has means for calling a plant state about the monitoring point and an individual condition for each monitoring point. In addition, it has means for increasing visibility by changing a plot color about data outside the upper/lower limit.

(Advantage)

As described above, according to Embodiment 11, the upper/lower limit values calculated by statistic processing on the basis of specified conditions and data used for calculation are displayed on the same graph and at the same time, the plant data count within the upper/lower limit and the data count outside the upper/lower limit are displayed. Accordingly, it is possible to quantitatively confirm the accuracy of the calculated statistical upper/lower limit.

EMBODIMENT 12

(Configuration)

Hereinafter, the Embodiment 12 of the present invention will be described. It should be noted that the description is omitted since the configuration of the Embodiment 12 is the same as that of the Embodiment 11.

(Operation)

As described above in the Embodiment 11 with reference to FIG. 8, the limit-value matching means A26 displays on the same graph the statistical upper/lower limit values stored in the limit-value function table A11 and the plant data extracted during the upper/lower limit calculation.

The statistical upper/lower limit functions (factors) for the monitoring points are displayed on the graph screen. The operator manually changes a factor in the functional expression through the display device A15 to reset a statistical upper/lower limit value the operator assumes appropriate.

(Advantage)

As described above, according to the Embodiment 12, statistical upper/lower limit values for monitoring points are automatically calculated on the basis of history data. If appropriate history data is not available, the operator changes a factor in the functional expression, and then the result is reflected on the statistical upper/lower limit values at monitoring checking. In other words, it is easy to edit statistical upper/lower limit values at plant monitoring.

EMBODIMENT 13

The configuration of Embodiment 13 in accordance with the present invention will be described with reference to FIG. 9; and the data processing will be described with reference to FIG. 26.

(Configuration)

Figure 9:
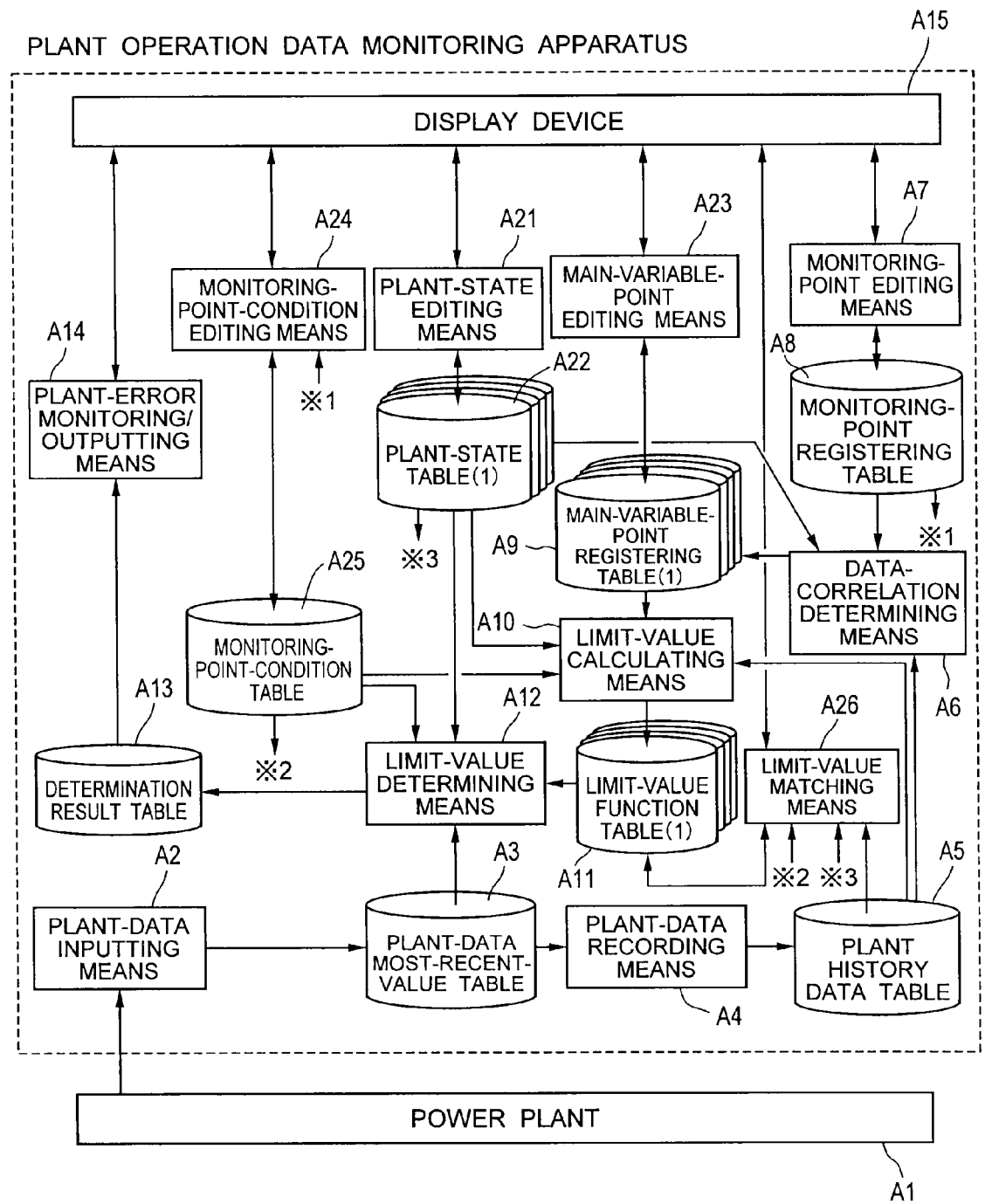
FIG. 9 shows a configuration of an Embodiment 13 in accordance with the present invention.

The plant-state editing means A21 in FIG. 9 can set a plurality of plant states (1) to (n). The Embodiment 11 is configured to have a plurality of plant-state tables A22 (1) to (n) for each plant state, a plurality of main-variable-point registering tables A9 (1) to (n) and a plurality of limit-value function tables A11 (1) to (n). It should be noted that the reference numbers *1 to *3 indicate the same reference numbers are connected to each other in FIG. 9.

(Operation)

Figure 26:
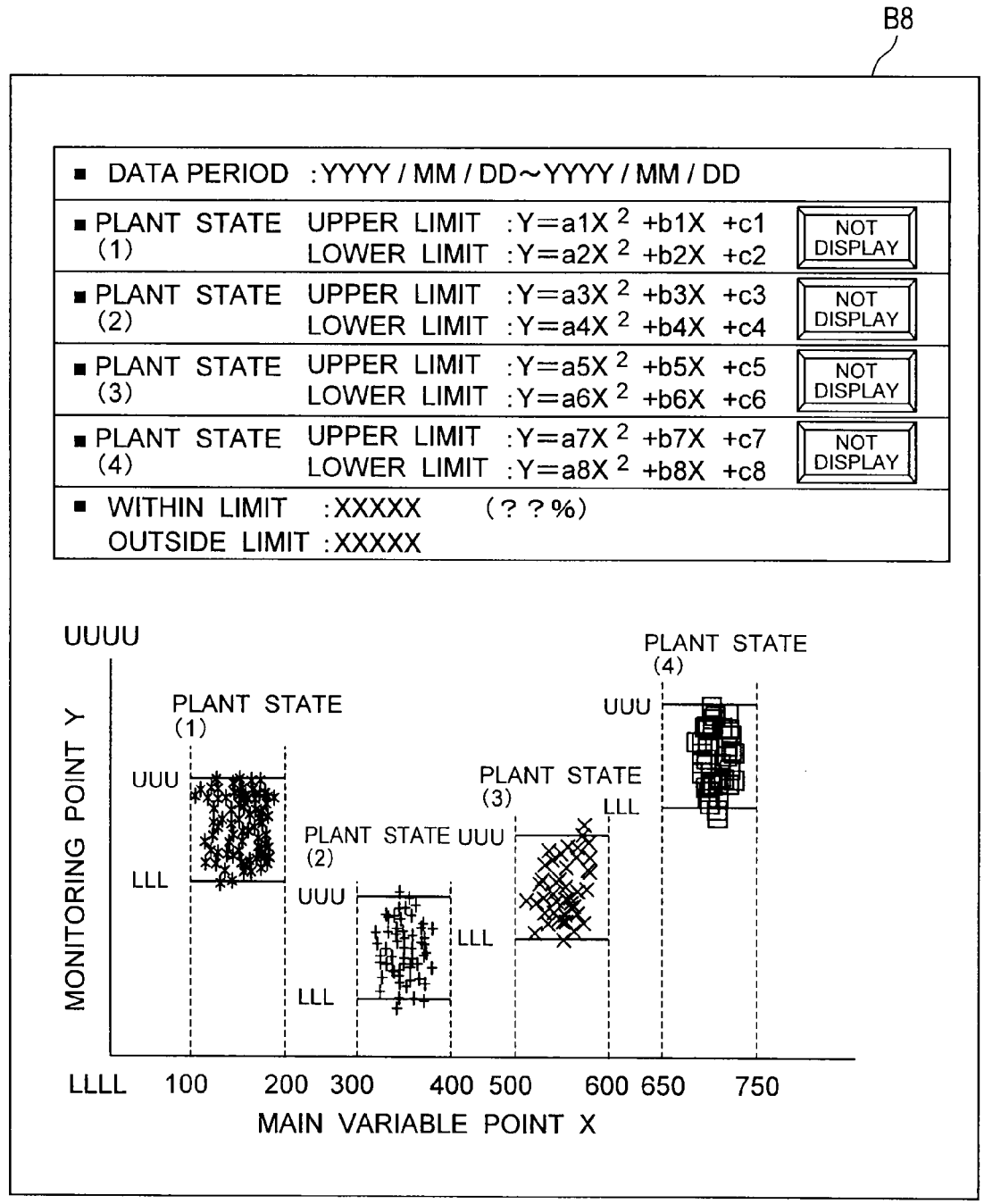
FIG. 26 is an explanatory drawing showing an example of plotting statistical upper/lower limit values in a plurality of plant states on a same graph in the Embodiment 13 in accordance with the present invention.

With reference to FIG. 9, the limit-value matching means A26 reads the statistical upper/lower limit values stored for each of the plurality of plant states with respect to a monitoring point and the plant data used for the calculation; and displays overlay data on the same graph by changing colors and makers (FIG. 26). If a plurality of upper/lower limit values and plant data are overlay-displayed depending on a plant state, the numerical values indicating supplemental information inside the graph are displayed shifted without an overlay.

(Advantage)

As described above, according to the Embodiment 13, it is possible to display on the same graph the statistical upper/lower limit values between monitoring points and main variable points in a plurality of plant states and the plant data used for the calculation; to provide identification information such as a color and a marker; and confirm data distribution in a plant monitoring area changing depending on a plant state.

EMBODIMENT 14

(Configuration)

Hereinafter, the Embodiment 14 of the present invention will be described. It should be noted that the description is omitted since the configuration of the Embodiment 14 is the same as that of the Embodiment 13.

(Operation)

With reference to FIG. 9, when the limit-value matching means A26 displays the statistical upper/lower limit values of a monitoring point in a plurality of plant states and the plant data used for the calculation on the same graph, it is possible to select to display or not to display the graph for each plant state on the graph display screen.

(Advantage)

As described above, according to the Embodiment 14, means is provided of not displaying the graph of the statistical upper/lower limit values and the plant data used for calculation for each plant state and thus it is possible to display only the graph in the plant state to be focused.

What is claimed is:

1. A plant operation data monitoring apparatus comprising:
plant-data inputting means for inputting plant data from a plant facility;
a plant-data most-recent-value table for temporarily storing a most recent value of said plant data;
plant-data recording means for retrieving said most recent value from said plant-data most-recent-value table and recording long-term time-series plant data in a plant data history table;
monitoring point editing means for editing to register data regarding one or more monitoring points for monitoring an error of said plant facility in response to an operator request;
a monitoring-point registering table for storing a result registered by said monitoring-point editing means;
data-correlation determining means for selecting one or more main variable points having a strong correlation to the corresponding monitoring point from said plant-data history table using said monitoring point as a key;
a main-variable-point registering table for registering a main variable point selected by said data-correlation determining means;
limit calculating means for calculating to define a statistical upper/lower limit value function for said plant-data history table on the basis of time-series plant data of said monitoring point and said main variable point;
a limit-value function table for storing a limit-value function defined by said limit-value calculating means;
limit-value determining means for referring to table information in said limit-value function table and for periodically matching content of said plant-data most-recent-value table with the table information, and if the most recent value is outside the limit value range, deviation information due to a plant error is determined and stored in a determination result table;
plant-error monitoring/outputting means for monitoring and outputting an error signal and content of said determination result table if a new plant error occurs; and
a display device for displaying an output from said plant-error monitoring/outputting means.

2. The plant operation data monitoring apparatus according to claim 1, further comprising:
a data-count/weighting-factor conversion function, wherein
when statistical upper/lower limit values are calculated with monitoring points and main variable points by said limit-value calculating means, an optimum upper/lower limit range is obtained by performing a limit calculation considering a data distribution density in units of divided clusters.

3. The plant operation data monitoring apparatus according to claim 1, wherein:
a condition indicating the plant is stable is provided from outside; when statistical upper/lower limit values are calculated with monitoring points and main variable points, history data is extracted on the basis of said condition to calculate a less varying limit value; and the limit value is used to perform monitoring checking.

4. The plant operation data monitoring apparatus according to claim 1, wherein as a result of statistical processing, if a distribution in a correlation between said monitoring points and said main variable points is divided into two or more groups, a condition for distinguishing these groups is provided from outside.

5. The plant operation data monitoring apparatus according to claim 4, wherein as a condition for distinguishing a plurality of groups, a data mining method is applied to history data to automatically extract the most appropriate plant condition for distinguishing groups.

6. The plant operation data monitoring apparatus according to claim 1, wherein:

a plurality of plant states are defined;

one or more main variable points having a strong correlation to said monitoring point in each plant state are automatically calculated;

the statistical upper/lower limit values of said monitoring point are provided as a plurality of functions of said main variable points for monitoring whether the function is in a defined plant state; and the upper/lower limit values of the matched function are used for monitoring.

7. The plant operation data monitoring apparatus according to claim 6, wherein a priority statistical process is performed so that said main variable points may be reduced to a same point even in a plurality of plant states.

8. The plant operation data monitoring apparatus according to claim 6, wherein said main variable point is provided from outside to calculate the statistical upper/lower limit values in a plurality of plant states.

9. The plant operation data monitoring apparatus according to claim 6, wherein the statistical upper/lower limit values of a plurality of said monitoring points in each of the plurality of plant states are calculated.

10. The plant operation data monitoring apparatus according to claim 9, wherein:

when a common plant state is defined for a plurality of said monitoring points to perform monitoring, an independent plant condition is provided for each of the said monitoring points; and the statistical upper/lower limit values are calculated to perform monitoring.

11. The plant operation data monitoring apparatus according to claim 10, wherein:

the calculated statistical upper/lower limit values of said monitoring points and said plant data used for calculation are displayed on a same graph;

at the same time, upper/lower limit matched data count and outlier count are displayed; and validation is performed on the calculated values.

12. The plant operation data monitoring apparatus according to claim 11, wherein:

a functional expression indicating a statistical upper/lower limit value or a factor thereof is displayed;

the factor is manually modified; and the modified factor can be confirmed on a graph display.

13. The plant operation data monitoring apparatus according to claim 12, wherein the statistical upper/lower limit values and said plant data used for calculation in a plurality of common plant states and independent plant conditions can be displayed on a same graph by changing colors and marker shapes.

14. The plant operation data monitoring apparatus according to claim 13, further comprising:

means for not displaying information in a certain state as needed when a plurality of states are overlay-displayed.

* * * * *